(12) United States Patent
Shembel et al.

(10) Patent No.: US 7,601,182 B2
(45) Date of Patent: Oct. 13, 2009

(54) PRODUCTION METHOD OF LITHIUM BATTERIES

(75) Inventors: Elena Shembel, Coral Springs, FL (US); Yevgen Kalynushkin, Pompano Beach, FL (US); Peter Novak, Fort Lauderdale, FL (US); Aleksander Markevich, Dnipropetrovsk (UA); Aleksander Balakin, Dnipropetrovsk (UA)

(73) Assignee: Enerize Corporation, Coral Springs, FL (US)

( * ) Notice: Subject to any disclaimer, the term of this patent is extended or adjusted under 35 U.S.C. 154(b) by 697 days.

(21) Appl. No.: 10/898,398

(22) Filed: Jul. 23, 2004

(65) Prior Publication Data

US 2005/0102824 A1    May 19, 2005

(30) Foreign Application Priority Data

Jul. 25, 2003  (UA)  ............ 2003077004
Dec. 31, 2003  (UA)  ............ 20031213443

(51) Int. Cl.
*H01M 6/04* (2006.01)
(52) U.S. Cl. ............ 29/623.1; 29/623.5; 429/188; 429/304; 429/305

(58) Field of Classification Search ............ None
See application file for complete search history.

(56) References Cited

U.S. PATENT DOCUMENTS

| 4,572,873 | A  |   | 2/1986  | Kanehori et al. |
| 6,004,697 | A  | * | 12/1999 | Thackeray et al. ............ 429/223 |
| 7,138,208 | B2 | * | 11/2006 | Tanjo et al. ............ 429/145 |
| 2004/0048161 | A1 | * | 3/2004 | Sunagawa et al. ............ 429/231.5 |

FOREIGN PATENT DOCUMENTS

WO    WO01/71832    *    9/2001

OTHER PUBLICATIONS

Julien, C., El-Farh, L., Balkanski, M., Hussain, O.M., Nazri, G.A., The growth and electrochemical properties of metal-oxide thin films: lithium intercalation, Applied Surface Science 65/66 (1993) 325-330.*

* cited by examiner

*Primary Examiner*—Patrick Ryan
*Assistant Examiner*—Cynthia Lee

(57) ABSTRACT

Electrochemical active cathode layers ($MoO_3$, $FeS_2$) are produced on the substrate of stainless steel, aluminum, or titanium by the method of thermal vacuum condensation-solidification. This method enables formation of active cathode layer in the wide thickness range of 0.5 μm-3.0 mm.

24 Claims, 5 Drawing Sheets

Layer thickness, mm

Film thickness, mkm

PRODUCTION METHOD OF LITHIUM BATTERIES

CROSS-REFERENCE TO RELATED APPLICATIONS

Figure 1:
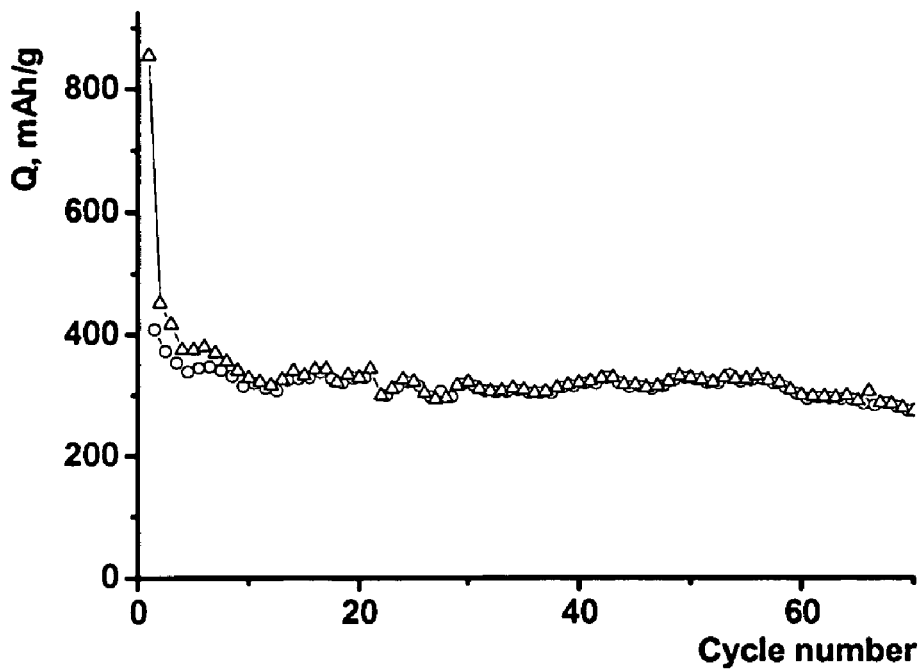

This application claims the benefit of Ukrainian Application No. 2003077004 filed on Jul. 25, 2003 now Patent No. 67135 issued on Jun. 15, 2004, and Ukrainian Application No. 20031213443 filed on Dec. 31, 2003; the entirety of which is incorporated herein by reference.

This invention relates to chemical power sources and more particularly to those with lithium-based anode, non-aqueous electrolyte and cathode where metal oxides or sulfides are used as an active cathode substance.

Specific discharge characteristics of lithium power sources with solid-phase cathode, to a great extent, depend on the cathode properties, in particular, its specific discharge capacity per weight and volume unit. There are the known lithium power sources with the cathode mass comprising active substance, conducting additive, for example, graphite and/or black and a binder. Cathode mass is prepared from the powders of these components [1].

From the above cathode mass components only active substance is electrochemically active. The conducting additive provides sufficient electronic conductivity in cathode mass volume. A binder provides mechanical strength of cathode mass. It should be noted that mechanical strength is needed both at power source assembly and in the process of its operation. It is connected with the fact that at discharging cathode mass volume increases, and decreases at charging. As a result, mechanical stress can appear and lead to electrode destruction. The binder should provide mechanical strength of cathode at the all stages of its work.

Difficulties in the production of dispersion particle and cathode material component homogeneous distribution at mechanical mixing is the disadvantage of the method. In addition, availability of ballast electrochemically passive material in the composition of positive electrode active mass (conducting and binding additives) decreases greatly specific electrical characteristics of the produced power source.

It is known the production method of the ballast-free cathode based on molybdenum oxide of non-stoichiometric compound intended for the work in low temperature lithium secondary batteries. The method consists in cathode deposition of molybdenum oxides on a current collector from ammonium molybdate solutions [2].

Need for the tight control of electrolysis mode parameters, electrolyte composition, low production rate of electrochemically active cathode substance with the necessary thickness and impossible production of molybdenum oxide with the layer thickness (about 1 mm) should be considered as the disadvantages of the method. Besides, before power source assembly with the cathode manufactured by this method, the need for its long thermal treatment aimed at water residue removal from electrode structure appears.

It is known the production method of non-ballast cathode based on titanium disulfide. At this method cathode layer formation occurs from a gaseous phase. In its turn, in the gaseous phase chemical reaction proceeds between titanium chloride and hydrogen sulfide. The interaction product (titanium disulfide) is deposited on a current collector as a thin film with the thickness ranging from 1 to 10 μm [3].

High toxicity of hydrogen sulfide which is one of the reagents for cathode material synthesis should be considered as the disadvantages of this method. Besides, this technological process does not allow to produce cathode material films with the thickness up to 1 mm, that decreases significantly the range of application and possibilities of chemical power source design.

Production method of the ballast-free active cathode material based on $MoO_3$ by the anodic oxidation of high purity (99.98%) sheet molybdenum in the electrolyte comprising 1 M tartrate sodium, 0.13 M tartaric acid and 0.01 M sodium carbonate at 2.4 $mA/cm^2$ current density and room temperature is the closest to the technical solution proposed by the authors [3].

High value of high-purity molybdenum, low production rate and indeterminacy of the main physical parameters of electrochemically active cathode layer (thickness, specific weight, etc) and impossibility to produce $MoO_3$ thick layers (about 1 mm) should be considered as the disadvantages of the prototype. Besides, before assembly of the power sources with the cathode manufactured by the method, the necessity of its long thermal treatment aimed at water residue removal from electrode structure arises.

Design of the power source where increasing specific energy characteristics is achieved at the cost of the additional amount of electrochemically active mass substituting binder and conducting additive is the task of this invention.

Solving the set task is achieved at the cost of the fact that in the production method of lithium battery comprising active cathode mass applied on a current collector, anode, separator and non-aqueous electrolyte, according to the invention, the cathode mass contains 100% electrochemical active material in the form of metal oxides or sulfides as a compact deposit. In this case cathode mass density is 2.6-4.9 $g/cm^3$, and cathode active layer thickness is selected within the range 0.002-1.5 mm. Lithium alloys, carbon or any other compounds reversible in lithium cations are used as an anode material.

Active cathode material is produced as a compact deposit, consisting of molybdenum trioxide ($MoO_3$) in one case, and in another, of iron sulfide, mainly, of $FeS_2$-pyrite. In this case cathode provides bending without contact fault between active mass and current collector in the bending radius range 0.4-3.9 mm at the layer thickness of active cathode material ranging from 4 μm up to 440 μm.

Besides, new useful properties are added to the invention, if the specific weight of cathode material active layer and its structure are changed in the direction from the current collector/active cathode material interface to the cathode active material/non-aqueous electrolyte interface so that at the current collector/active cathode material interface, active material density is higher than that at the active material/liquid electrolyte interface, in this case the density can change by the value 2 $g/cm^3$ in the thickness of electrochemically active metal oxide layer up to 1.4 mm. Active material specific weight decrease in the direction of the electrode/electrolyte interface promotes increasing porosity and material specific surface at the electrode/electrolyte interface. This adds to the object a new useful effect consisting in the fact that at the same geometric current density, the actual current density at the electrode/electrolyte interface decreases, i.e. electrochemical process occurs in cathode volume. This indicates electrode effective work at the increased geometrical densities of discharging current.

Increasing cathode material porosity at the boundary with electrolyte also contributes to the optimization of the electrode/solid electrolyte structure. Solid inorganic electrolyte is applied on electrode by the method including the stage of material transition from a gas to a liquid stage, then to a solid one. At the stage of solid electrolyte material transition from a gas to liquid stage, the electrolyte penetrates into the pores of cathode materials and uniformly distributes in electrode volume. In this case, the high mechanical strength of the electrode/electrolyte interface is the additional positive property of the formed structure.

The metal with a developed surface is used as a cathode current collector. Stainless steel, aluminum or titanium are used as the current collector material.

In the process of $MoO_3$ application, temperature of cathode current collector ranges from 210 up to 250° C. AT LAYER COOLING RATE FROM 18 up to 22° C./s. In the process of $FeS_2$ application in the presence of sulfur vapors, cathode current collector temperature ranges from 20 up to 60° C. Produced by such a method oxide or sulfide cathode is used in primary and secondary power sources.

In the deposition process of thin (more 80 μm) layers of $MoO_3$ for primary power sources, cathode current collector temperature ranges from 230 up to 270° C. at the cooling rate of layer 2-4° C./s. In this case the metal with a developed surface is used as a cathode current collector. For example, it may be the metal foil on which surface the powder of the same metal with the different dispersity is applied.

Figure 2:
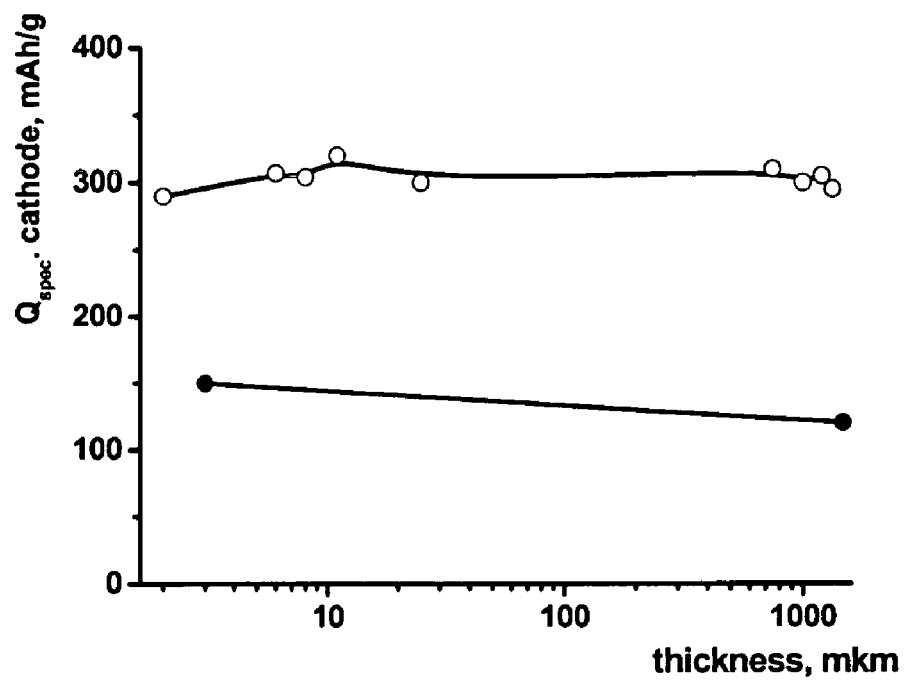
Figure 3:
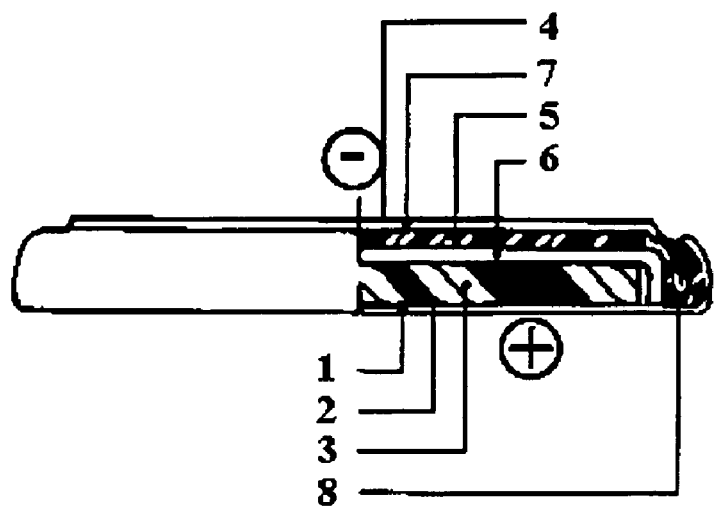
Figure 4:
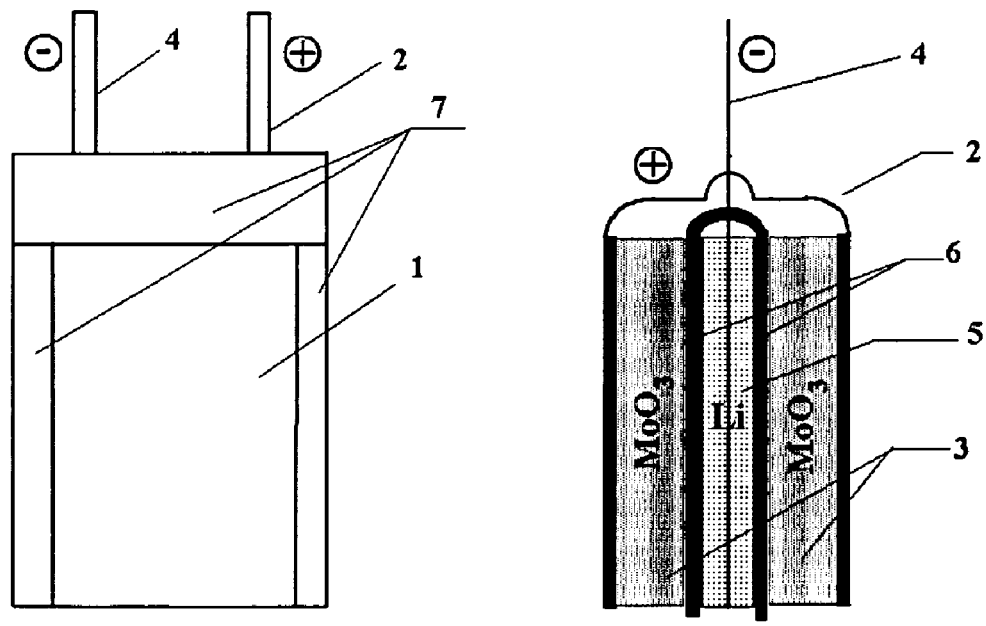
Figure 5:
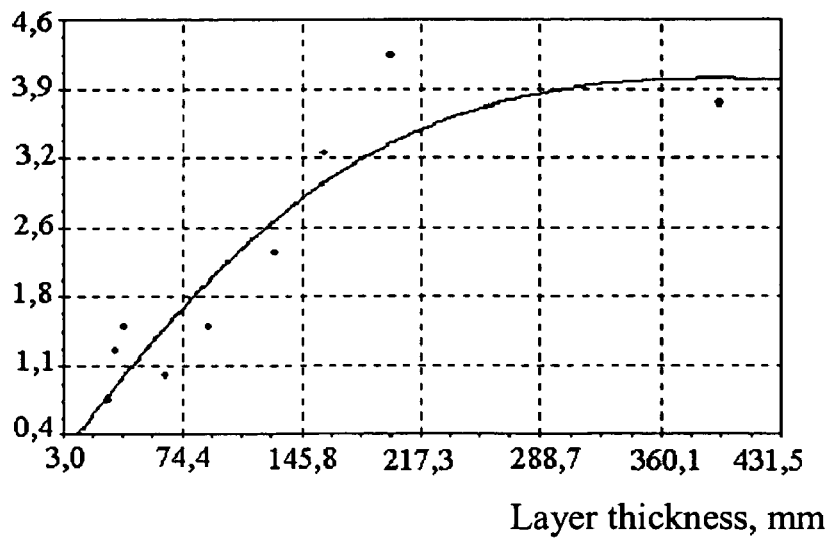
Figure 5:
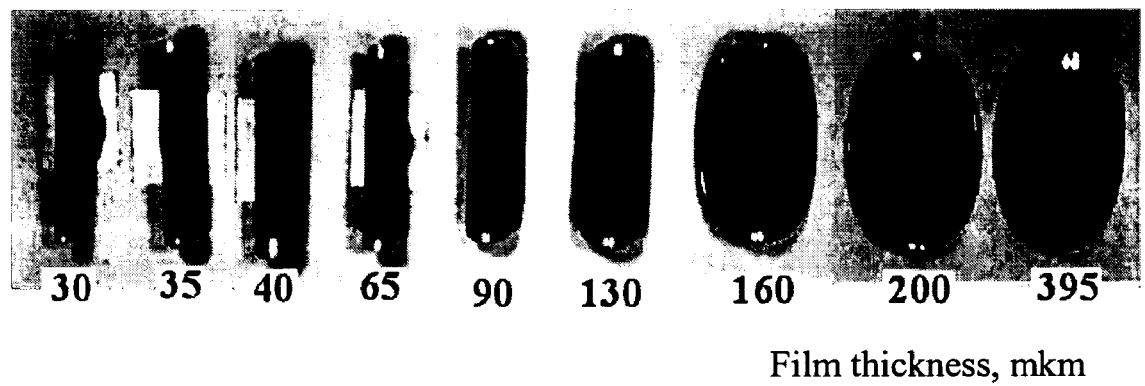
Figure 6:
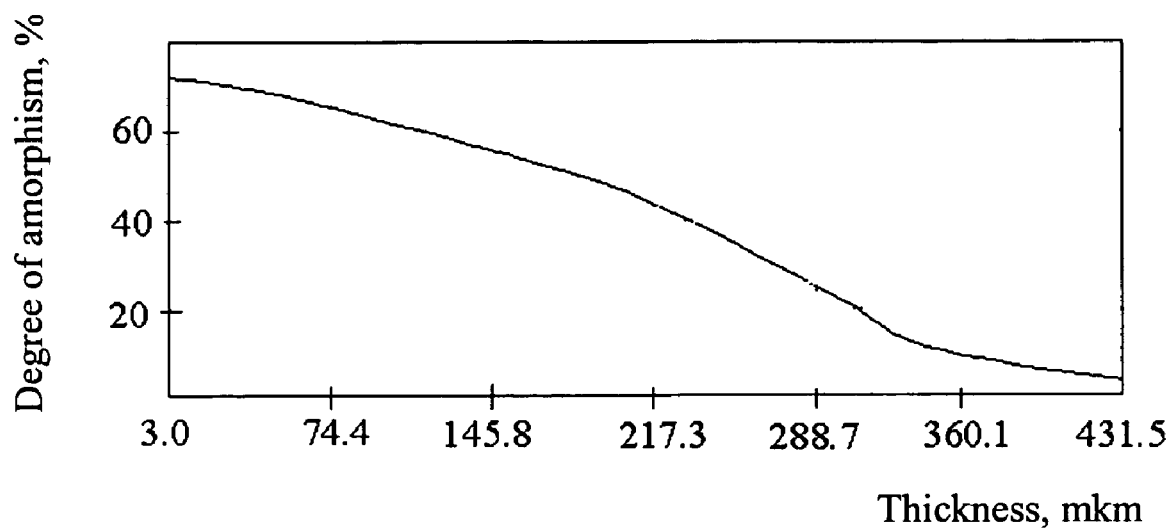
Figure 7:
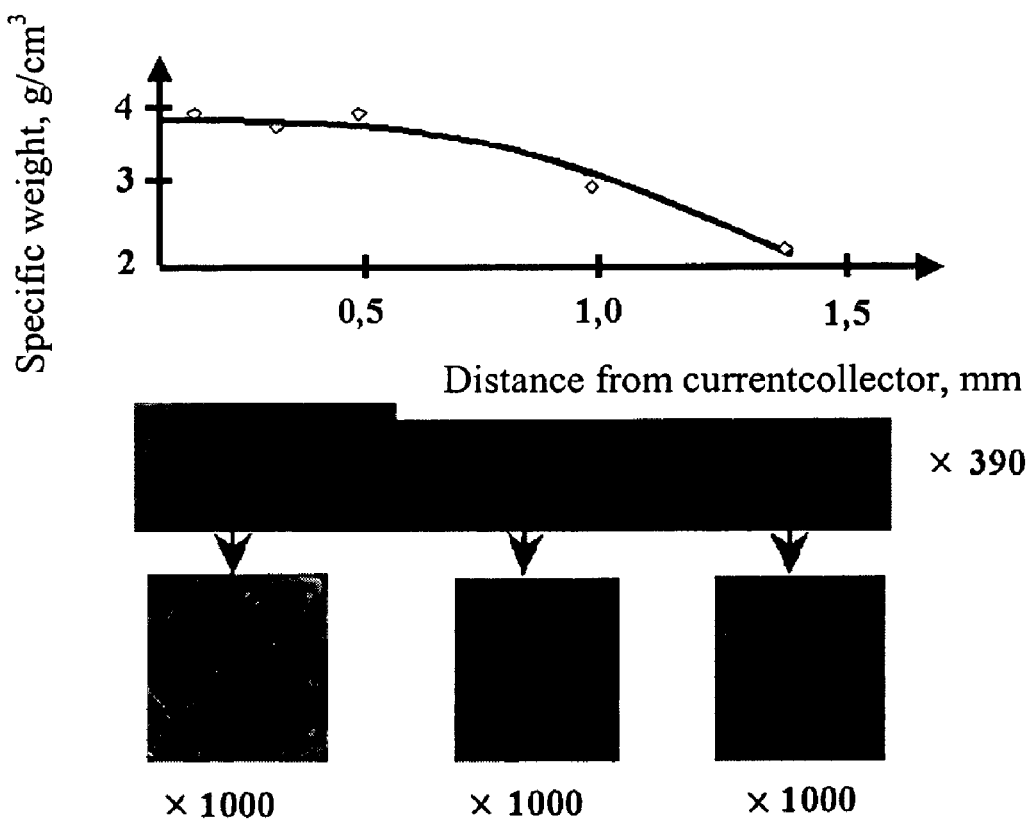
Figure 8:
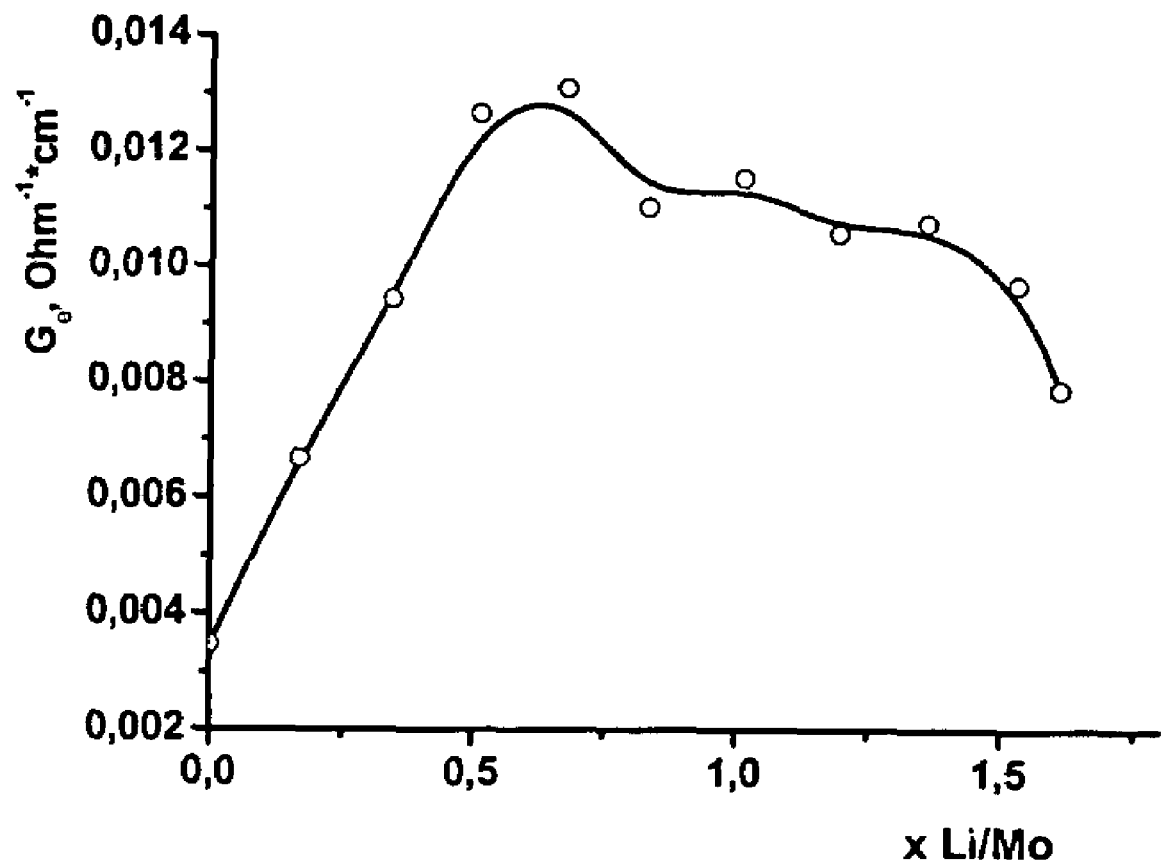

Enumeration of figures: FIG. 1. Change of the specific capacity of $FeS_2$-based cathode depending on a number of charge-discharge cycles. Curve with triangular points corresponds to a discharge. Curve with round points corresponds to a charge. FIG. 2. Dependence of specific discharge capacity on cathode material thickness. Line with transparent points corresponds to the discharge current density up to 0.8 mA/cm$^2$. Line with black points corresponds to the discharge current density of 5 mA/cm$^2$. FIG. 3. Circuit of the prototypes of the disc design micro battery based on $MoO_3$, produced by the method of thermal vacuum condensation-solidification. FIG. 4. Circuit of the prototypes of prismatic design micro battery with the $MoO_3$,-based cathode produced by the method of thermal vacuum condensation-solidification. FIG. 5. Investigation of the mechanical strength, adhesion and cohesion of electrodes based on molybdenum oxides. FIG. 6. Dependence of $MoO_3$ structure amorphism on electrode thickness. FIG. 7. Change of the specific weight of $MoO_3$ in the cathode thickness produced by the method of thermal vacuum condensation-solidification in the cathode thickness. FIG. 8. Change of the specific electronic conductivity of $MoO_3$ layer depending on the electrode discharging degree.

In lithium battery the following electrolytes are used as non-aqueous ones:

1. Liquid electrolyte
2. Polymer electrolyte
3. Solid inorganic electrolyte.

All electrolytes have lithium cation conductivity.

In the 3-d case, cathode surface is covered by the layer of solid electrolyte which thickness is 2-10 μm. This combination provides such new useful properties as raising specific capacity during electrochemical cycling. Application of solid electrolyte is realized by a complicated staged evaporation of material followed by staged cooling.

Between the layer of solid electrolyte covering cathode surface and anode there is a separator impregnated with liquid non-aqueous electrolyte, or polymer electrolyte.

Modification of positive electrode surface by the layer of solid electrolyte is used for the manufacture of secondary power sources. At modification of positive electrode surface by the layer of solid electrolyte, the reversible electrochemical characteristics of electrodes, which active mass thickness ranges from 0.5 to 80 μm, increase.

The above characteristics are reached due to the application of the method of thermal vacuum condensation-solidification with the optimal rate of applying the active mass of positive electrode and solid electrolyte for electrode manufacture.

Selection of $MoO_3$ as a cathode material in chemical power sources, in this claim is results from the fact that at heating above 600° C. this oxide trends to pass to a gaseous state without changing its chemical composition [5]. Most of other oxides which is widely used in primary cells and rechargeable lithium power sources does not posses these properties. Say, manganese dioxide ($MnO_2$) at heating above 535° C. before passing to a gaseous state is decomposed into $Mn_2O_3$. Vanadium pentoxide ($V_2O_5$) is also decomposed at heating above 1750° C., before passing to gaseous state [6]. Most of metal sulfides shows the tendency to chemical destruction at heating up to high temperatures. Production of iron disulfide ($FeS_2$) as a thin film, which is also presented as a cathode material for lithium chemical power sources in this claim, has become possible due to process of thermal vacuum spraying at the sulfur vapors availability in a working chamber. At the thermal evaporation of $FeS_2$, the products of iron disulfide decomposition pass to a gaseous state. In this case the iron compounds which evaporate and pass into the chamber volume, are united in sulfur.

At thermal $FeS_2$ evaporation, the products of iron disulfide decomposition pass in a gaseous state. In this case the iron compounds which are evaporated and pass into a chamber volume, are united in sulfur. The process of $FeS_2$ spraying in the presence of sulfur vapors, which are introduced additionally into the volume of working chamber, shifts the chemical equilibrium towards iron disulfide formation. $FeS_2$, formed due to the process is deposited on a substrate, forming the film of electrode material.

The filed boundary characteristics depend on the following:

1. At the specific weight of positive electrode active mass less than 2.6 g/cm$^3$, the volume specific discharge characteristics of cathode and the power source, as a whole, decrease.

2. Thickness of positive electrode active mass layer of at least 0.5 μm does not allow to produce the uniform layer of $MoO_3$ along the whole surface of current collector. In this case the material balance of battery also deteriorates, since the need of significant decreasing the weight and thickness of current collector appears.

3. For secondary power source the cathode mass thickness of positive electrode should not exceed 80 μm, as far as the greater thickness of layer does not allow to obtain high reversible specific electrochemical characteristics in liquid and polymer electrolytes.

4. In the case of secondary power source, the positive electrode which surface is non-modified by the layer of solid electrolyte, is characterized by decreased reversible specific electrochemical characteristics effecting negatively on the charge-discharge characteristics of power source as a whole.

5. In the case of primary power source, thickness of electrodes, which do not contain a binder and conducting additive, reaches 3 mm. Use of thick electrodes enables considerable increasing specific characteristics of power source. This results from the considerable improvement of the material balance of the cell which is characterized by the ratio of the active materials of power source and structural materials.

$MoO_3$ and $FeS_2$-based cathodes with a high relative density, produced by the method of thermal vacuum condensation-solidification are proposed as an example in this invention. High cathode mass relative density provides the high specific electrical-characteristics of lithium power source. Useful advantages of this method and cathode produced on its base are as follows:

after cathode production and its storage in dry atmosphere it does not require thermal treatment aimed at the removal of water residua from electrode structure.

rate of $MoO_3$-based cathodes produced by the method of thermal vacuum condensation-solidification (1-30 μm/s) exceeds considerably the rate of cathode production described in the analogues and prototype.

the produced cathodes have high mechanical strength, in spite of the fact that a binder is not a part of cathode mass. This results from a high adhesion between cathode material and current collector, and between the particles of cathode material a high cohesion is observed.

The produced cathodes based on molybdenum oxides have such useful property as a low resistance, in spite of the fact that cathode mass composition does not comprise conductive additive. Therefore, the produced molybdenum oxide structure has a high electron conductivity. Ions of metals which are present in a deposit structure as a negligible admixture [7] provide a high ion conductivity for the electrode layers of $MoO_3$ produced by the method of thermal vacuum condensation-solidification metal ions. In this case high electronic conductivity is provided with molybdenum ions of the lower oxidation degrees [8]. Intercalation of such ions into cathode structure is provided at the moment of $MoO_3$ evaporation. Metal molybdenum was used as the material of evaporator. At the moment of evaporation, a small part of $MoO_3$ by the reaction of disproportionation interacts with metal molybdenum with a low oxide formation which molecules comprise molybdenum ions of the lower oxidation degree. Partially reduced molybdenum ions from gaseous phase are deposited on the substrate-current collector and build in the crystalline structure of the main substance ($MoO_3$) as an admixture, providing high electronic conductivity of cathode deposit.

Quantity of evaporated material, evaporation temperature, time of evaporation, substrate temperature, rate of substrate cooling, volume of working chamber are the main factors effecting on the quality of electrode material layer.

The following examples characterize novelty and industrial applicability of the claimed invention.

EXAMPLE 1

Stainless steel substrate of 20 mm diameter is placed in a vacuum unit for material deposition under the condensation-crystallization conditions. Substrate surface is subjected by sand-blasting with 3-4 μm relief depth followed by ionic cleaning at the anode voltage 1.5 kV. After working chamber pumping-out up to the residual pressure $10^{-5}$ TORR, $MoO_3$ powder (10 mg) is transformed into a vaporous state and is deposited on a substrate. Analysis of the produced coating has shown its low adhesion to a substrate, as evidenced by the numerous sections of separation and cracking. (Table. 1 p. 1).

EXAMPLE 2

In the unit described in Example 1, quantity of the sprayed substances has been increased up to 15 mg, and the working chamber volume has been decreased by 2 times. Evaporation of the initial substance was carried out at 620° C. Substrate temperature was increased up to 200° C. Time of spraying is 3 sec. Thus, the conditions necessary for substance condensation on a substrate as a liquid phase state have been created. Liquid layer of $MoO_3$ was crystallized with the help of forced cooling by argon jet. Cooling rate was 10° C./sec. Analysis of the produced coating has shown that at 8-10 μm thickness it has a good adhesion to a substrate. Adhesion strength was determined by the minimum radius of sample bending at which micro cracks reaching a substrate on its surface were observed. Analysis of sample cracking was carried out with the help of scanning electron microscope. Value of the bending radius was 1.2 mm. X-ray diffraction analysis (XRD) of the produced sample has discovered availability of $MoO_2$, $MoO_3$, $Mo_4O_{11}$ phases in it. (Table. 1 p. 2).

EXAMPLE 3

In the unit described in Example 2, evaporation temperature of a substance was increased up to 700° C. Temperature of a substrate was 100° C. Cooling temperature after liquid layer condensation was increased up to 20° C./sec. Analysis of the produced coating has shown, that in a thickness and adhesive strength it corresponds to its analogue described in Sample 2, however, by the results of XRD analysis it has amorphous structure. (Table. 1 p. 3).

EXAMPLE 4

In the unit described in Sample 3, coating of initial $MoO_3$ has been produced at substrate temperature 130° C. Analysis of the produced coating has shown that it is presented as $Mo_4O_{11}$ compound. (Table. 1 p. 4).

EXAMPLE 5

In the unit described in Example 3, the coating of initial $MoO_3$ has been produced from initial $MoO_3$ at substrate temperature 160° C. XRD analysis has shown that the layer compound corresponds to $MoO_2$ stoichiometry. (Table. 1 p. 5).

EXAMPLE 6

In the unit described in Example 3, coating of the initial substance $MoO_3$ has been produced at substrate temperature 230° C. Analysis of the produced coating has shown that it has thin differential plastic structure and corresponds to $MoO_3$ stoichiometry. (Table. 1 p. 6).

EXAMPLE 7

In the installation described in Example 3 the coating of the initial $MoO_3$ substance has been produced at substrate temperature 300° C. Deposition time—20 s. In this case the sample is cooled from the side of substrate with the rate 3° C./sec. Thus, the sample with coating thickness 1.32 mm and the lamellar structure of $MoO_3$ has been produced. Average specific weight of the produced $MoO_3$ layer was 2.3 g/cm$^3$. (Table. 1 p. 7).

EXAMPLE 8

In the unit described in Example 7, it has been produced a coating of the initial substance $MoO_3$ at substrate temperature 250° C. Thus, the sample with 1.3 mm thickness has been produced with the lamellar structure of $MoO_3$. Average specific weight of the produced $MoO_3$ layer was составл ляля 2.73 g/cm$^3$. (Table 1 p. 8).

EXAMPLE 9

In the unit described in Example 3, coating from the initial substance FeS2 has been produced at substrate temperature 40° C. Working space was heated up to 500° C. Initial substance was evaporated at 750° C. and deposited on the substrate during 50 sec. The layer mass was 1 mm at the satisfactory adhesion to a substrate. Phase compound of coating: $Fe_9S_8+S$ monoclinic.

EXAMPLE 10

In the unit described in Example 8 coating has been produced from the initial substance $FeS_2$ at substrate temperature 40° C. However, using additional evaporator, sulfur vapor was supplied to operation space at 240° C. Evaporation of $FeS_2$ was carried out at 800° C. Total time of spraying is 51 s. Mass of the sprayed layer was 1.4 mg. Phase analysis enables detection of the following components in the sprayed layer: $Fe_3S_4$—basis, $Fe_7S_8$—up to 5%.

EXAMPLE 11

In the unit, described in Example 9, it has been produced the coating of the initial substance $FeS_2$ at substrate temperature 40° C. Sulfur vapor was introduced at 150° C. Total time of spraying is 110 seconds. Mass of the sprayed layer—4 mg. Phase analysis of coating has shown the following: sulfur (monoclinic)—50%, $FeS_2$—5%, $Fe_3S_4$—7%, FeS—30%, S orthorhombic—8%.

EXAMPLE 11

In the unit described in Example 10, coating from the initial substance $FeS_2$ has been produced at substrate temperature 40° C. Vapor of sulfur is introduced at 190° C. Total time of spraying—50 s. Coating mass—1.8 mg. Phase compound of coating—$FeS_2$ (pyrite)—95%, $Fe_2S$ (marcasite)—5%.

EXAMPLE 13

Deposition of solid inorganic electrolyte comprising lithium, tungsten and bore oxides was carried out on a thin $MoO_3$ film produced by the mode of Example 6 with the help of vacuum unit, which supposes condensation of vaporous phase with thin liquid layer formation followed by its crystallization analogically described in Example 3. Deposition was carried out under the following conditions: initial material was heated up to 900° C. for 21 sec and then was kept at this temperature during 4 sec. Further, temperature was raised up to 1500° C. for 4 sec., and isothermal holding for 2 sec was carried out. In this case full evaporation of the initial substance with the mass of 5 mg is observed. After substance condensation as a liquid film on the molybdenum oxide surface with the help of forced blasting with inert gas during 30 sec., liquid crystallized. At cooling electrode temperature is decreased from 200° C. up to 100° C. Analysis of 3 μm coating produced on molybdenum oxide with the thickness 3 μm has shown availability of the crystalline phases $Li_2WO_4$, $Li_4B_{10}O_{17}$. Film structure is coarse-grained, and is characterized by the different thickness, which variation reaches more than 30%. (Table 1, p. 13).

EXAMPLE 14

Deposition of solid inorganic electrolyte comprising lithium, tungsten and bore oxides was carried out on a thin $MoO_3$ film produced by the mode of Example 6 with the help of vacuum unit, which supposes condensation of vaporous phase with thin liquid layer formation followed by its crystallization analogically described in Example 3. Deposition was carried out under the conditions of Example 13 with the following changes: initial substance was heated up to 800° C. for 15 sec and then was kept at this temperature during 10 sec. Further, evaporator temperature was raised up to 1000° C. with the rate of 45° C./s. Isothermal holding at this temperature lasted 20 s. Temperature of $MoO_3$ was maintained at the level of 40° C. After substance condensation as a liquid film on molybdenum oxide surface with the help of forced blasting with inert gas during 30 sec., liquid crystallized. At cooling, electrode temperature is decreased from 200° C. up to 100° C. Analysis of 3 μm coating produced on molybdenum oxide with the thickness 3 μm has shown availability of the crystalline phases of $Li_2WO_4$. Analysis of the produced solid electrolyte film carried out by the method of X-ray diffraction and metal graphic analysis has shown its optical transparency and X-ray amorphous structure (Table 1, p. 14).

EXAMPLE 15

Deposition of solid inorganic electrolyte comprising lithium, tungsten and bore oxides was carried out on a thin film of $FeS_2$, produced under the conditions of Sample 12 with the help of vacuum plant, which supposes the vapour phase condensation with formation of liquid thin layer and its further crystallization, analogically described in Example 3. The deposition was carried out under the following conditions. The initial substance was heated up to 1000° C. for 10 s and is kept at this temperature during 5 sec. Then temperature of evaporator is increased up to 12000° C. for 2 sec with the following isothermal holding for 13 sec. After its finishing the substance is heated up to 1500° C. for 10 sec., and is held at the same temperature during 3 sec. Thus, total time of spraying was 43 s. During this time, temperature of FeS2 surface was linearly increased from 20° C. to 300° C. Cooling of the film formed on $FeS_2$ surface was carried out similar to Example 13. Analysis of the produced coating has shown that it has a coarse-crystalline structure with the phase composition and variation in thickness, similar to Sample 13 (Table 1, p. 15).

EXAMPLE 16

Deposition of solid inorganic electrolyte comprising lithium, tungsten, and bore oxides was carried out on a thin $FeS_2$ film produced under the conditions of Example 12 with the help of vacuum plant, supposing condensation of vapor phase with formation of thin liquid layer and its following crystallization similar to that described in Example 3. Deposition was carried out under the conditions of Example 15 with the following changes. Heating of initial substance in evaporator was carried out by the following method: temperature was increased up to 1000° C. for 10 sec., and then after 5-second isothermal holding up to 1200° C. for 5 s. At this temperature isothermal holding was 15 s, then temperature was step-wise increased up to 1500° C. at which the material was held for 3 s. Thus, the total time of spraying was 38 s. During this time temperature of $FeS_2$ surface linearly increased from 20 up to 300° C. Cooling of the film formed on $FeS_2$ surface was carried out similarly to Example 15. Analysis of the produced solid electrolyte film carried out by the method of X-ray diffraction and metal graphic analysis has shown its optical transparency and X-ray amorphous structure (Table 1, p. 16). Coating thickness was 4 μm (Table. 1 p. 16).

EXAMPLE 17

Electrode produced in Example 8 is placed to the case of disc design power source comprising lithium negative electrode and liquid aprotic electrolyte. In this case the surface of current collector, on which cathode material is applied, is developed. The power source is sealed and tested: its discharge density is measured. At cell discharging, its specific discharge capacity per cathode weight unit is 300 mA·h/g. It is 819 mA·h/cm$^3$ of cathode. Thickness of such electrode layer is 1.3 mm (Table. 2 p. 3).

EXAMPLE 18

Two electrodes produced under the conditions of Example 8, are placed into the case of prismatic design power source of laminated aluminum foil, which comprises lithium negative electrode and liquid aprotic electrolyte. Thickness of layer of one such electrode is 1.4 mm. Specific weight of $MoO_3$ decreases in the direction from current collector, on which oxide layer is applied, to the external surface of molybdenum oxide. In actual power source, the external boundary of $MoO_3$ borders with electrolyte. Specific weight of molybdenum oxide decreases from 3.9 g/cm$^3$ up to 2.1 g/cm$^3$ at the boundary with current collector on the external surface of $MoO_3$. Power source is sealed and tested: its discharge capacity is measured. At discharging specific volume capacity of the cell is 466 mA·h/cm$^3$. In this case cathode discharge capacity per $MoO^3$ weight unity reaches 300 mA·h/g. It is 800 mA·h/cm$^3$ of cathode (Table 2 p. 5).

EXAMPLE 19

Electrode produced in Example 6 is placed into the case of disc or prismatic power source of laminated aluminum foil, comprising lithium negative electrode and non-aqueous electrolyte. Power source is sealed and tested—its discharge capacity is measured. At cell discharging electrode capacity is 260-300 mA·/g of cathode at the first cycle. At charging at the second and following cycles (near 95 charge-discharge cycles) specific capacity ranges from 230 to 90 mA·h/g of cathode. In this case cathode layer thickness ranges 0.5-80 μm (Table 2, p. 6, 7).

EXAMPLE 20

Polymer electrolyte solution is poured out on the surface of electrode produced in Example 6. Polymer electrolyte film is formed by removing low-boiling solvent. Having moistened the surface of negative electrode and polymer electrolyte by liquid aprotic electrolyte, an electrode structure is assembled. Electrode structure is placed in the case of cell and sealed. The manufactured cell is tested including the measurements of its discharge capacity. At cell discharging, electrode discharge capacity is 200-300 mAh/g of cathode at the first cycle. At discharging, at the second and following cycles (up to 120 charge-discharge cycles) specific capacity is 230-100 mAh/g. In this case cathode layer thickness ranges from 0.5 to 80 μm (Table 2, p. 8, 9).

EXAMPLE 21

Electrode manufactured by Example 14 is placed into the case of cell. Separator impregnated with a liquid electrolyte is placed on the film surface of solid electrolyte. Assembly of electrode structure is completed with negative lithium electrode, then the cell is sealed. Tests of the manufactured cell include the measurements of its discharge capacity. At cell discharging, electrode discharge capacity is 390 mA·h/g of cathode at the first cycle. At discharging, specific capacity ranges from 300 up to 140 mA·h/g of cathode at the second and following cycles (up to 500 charge-discharge cycles). In this case cathode layer thickness is 2 μm (Table 2, p. 10).

EXAMPLE 22

Electrodes produced in Sample 12 is placed into the case of disc or prismatic power source of laminated aluminum foil, which comprises lithium negative electrode and non-aqueous electrolyte. The power source is sealed and tested: its discharge capacity is measured. At cell discharging, electrode discharge capacity is 850 mA·h/g of cathode at the first. At discharging at the second and following cycles the electrode did not show electrochemical activity (Table 2, p. 11).

EXAMPLE 23

Polymer electrolyte solution is poured out on the surface of electrode produced in Example 12. Polymer electrolyte film is formed by removing low-boiling solvent. Having moistened the surface of negative electrode and polymer electrolyte by liquid aprotic electrolyte, an electrode structure is assembled. The electrode structure is placed into the case of cell and sealed. The manufactured cell is tested including the measurements of its discharge capacity. At cell discharging, electrode discharge capacity is 850 mAh/g of cathode at the first cycle. At discharging, at the second and following cycles the electrode did not show electrochemical activity (Table 2, p. 12).

EXAMPLE 24

Electrode, manufactured by the Example 16, is placed into the case of cell. Separator impregnated with liquid electrolyte is placed on the surface of solid electrolyte film. Assembly of electrode structure is completed by negative lithium electrode, then a cell is sealed. The tests of the produced electrode include the measurement of its discharge capacity. At cell discharging, electrode discharge capacity is 850 mA·h/g of cathode at the first cycle. At discharging, at the second and the following cycles (up to 60 charge-discharge cycles) specific capacity ranges from 450 up to 300 mA·h/g. Change of specific capacity depending on a number of charge-discharge cycles, where FeS2 system (2 μm) is presented as a solid electrolyte (4 μm)—liquid electrolyte—Li is shown in FIG. 1 (Table 2, p. 13).

EXAMPLE 25

For the cathode based on molybdenum oxide, produced by the above method, discharge capacity is independent on the cathode material thickness in the $MoO_3$ thickness range 2-1330 μm. Specific discharge capacity decreases only by 20% at current density increase by 6 times from 0.8 mA/cm$^2$ to 5.0 mA/cm$^2$, as it is shown in FIG. 2.

EXAMPLE 26

$MoO_3$ layer of the different thickness is applied on some current collectors. Then, cathode layer adhesion strength to the current collector surface is investigated. The adhesion strength is determined by the minimum bending radius of the sample when on its surface the micro cracks reaching a substrate appear. Analysis of sample cracking was carried out with the help of scanning electron microscope. It is evident, that at cathode coating thickness more than 430 μm, radius of electrode bending is only 3.9 mm, while its mechanical properties preserved. These results have been obtained for the electrodes which do not comprise a binder in the composition of cathode material. The investigation results of mechanical strength, adhesion and cohesion of the electrodes based on molybdenum oxides produced by Example 5 are shown in FIG. 5.

EXAMPLE 27

$MoO_3$ layers of different thickness are applied on some current collectors. The dependence of oxide structure amorphism at thickness increase has been discovered by the method of morphological analysis on the investigation results on scanning electron microscope. Electrode thickness increase is accompanied by $MoO_3$ amorphism decrease. It is seen in FIG. 6.

EXAMPLE 28

At $MoO_3$ thickness increase, density of cathode material active layer and its structure change in the direction from the current collector/active material interface to the active cathode material/non-aqueous electrolyte interface so that at the interface current collector/active cathode material, current density of active material is higher than at the active material/liquid electrolyte interface. In this case, the density can change by the value 2 g/cm$^3$ in the thickness of electrochemical active layer $MoO_3$ up to 1.4 mm. Change of $MoO_3$ specific weight in cathode thickness produced by the method of thermal vacuum condensation-solidification is presented in FIG. 7.

EXAMPLE 29

Two electrodes produced under the conditions of Sample 8 are placed into the case of prismatic design power source of laminated aluminum foil comprising lithium negative electrode and liquid aprotic electrolyte. Thickness of one such layer is 1.3 mm. Specific weight of $MoO_3$ decreases in the direction from current collector on which oxide layer is applied to the external surface of molybdenum oxide. In actual power source the external boundary of $MoO_3$ borders on electrolyte. Specific weight of molybdenum oxide decreases from 3.9 g/cm$^3$ at the boundary with current collector up to 2.1 g/cm$^3$ on the external surface of $MoO_3$. Power source is sealed and tested: discharging by 10% of the nominal discharge capacity by the current at which cathode current density is 0.45 mA/cm$^2$, is held in the disconnected state during one day, after that its impedance characteristics are investigated with the help of electrode impedance method. From the spectrum presented on the R–1/w·C coordinates, electron component is calculated, which resistance almost fully relates to the cathode layer of $MoO_3$. It has been established that specific electron conductivity ($G_e$) of electrode layer based on $MoO_3$, linearly increases in the first third of discharge capacity from $3.5 \cdot 10^{-3}$ $\Omega^{-1} \cdot cm^{-1}$ up to $1.2 \cdot 10^{-2}$ $\Omega^{-1} \cdot cm^{-1}$, after that it slightly depends on the discharge degree. Change of specific electron conductivity of $MoO_3$ layer on the electrode discharge degree is presented in FIG. 8.

EXAMPLE 30

Power source prototype is manufactured by such a way. Cathode based on molybdenum oxide has been produced by the method of thermal vacuum condensation-solidification, described in Example 6. Thickness of $MoO_3$ layer ranges from 30 up to 170 μm. Specific weight of $MoO_3$ layer ranges 3.0 up to 3.6 g/cm$^3$. Molybdenum oxide is applied on aluminum foil current collector with the thickness 20 μm covered with the layer of solid inorganic electrolyte produced by Example 13. Solid electrolyte thickness is 4 μm. Lithium anode is also produced by the method of thermal vacuum condensation-solidification. Lithium anode thickness is about 55 μm. Copper foil of the 10 μm thickness is used as a current collector for lithium anode. Discharge cathode capacity is near 360 mA·h/g. Operation current density is up to 5 mA/cm$^2$ (Table. 2 p. 14).

EXAMPLE 31

Prototype of prismatic primary lithium power source with liquid electrolyte has been produced on the basis of $MoO_3$, obtained by the Example 8. The cell comprises the following components: two cathodes based on $MoO_3$, produced by condensation-solidification method. Average specific weight of cathode material is 2.66 g/cm$^3$. Cathode material thickness on one $MoO_3$—electrode is 1.25 mm. Geometrical size of electrodes is 2×(1.5×1.5) cm. Aluminum foil with the developed surface and 20 μm thickness is used as a cathode current collector. Separator thickness—25 μm. Discharge current—2 mA. Before testing, the power sources was stored for 4 months. Discharge capacity of cell is 475 mAh. Specific capacity of cathode is 317 mA·h/g. It is 843 mA·h/cm$^3$. Specific power per electrode structure volume is 1307 Wt·h/l (Table 2, p. 15).

EXAMPLE 32

Prototype of prismatic secondary power source based on $MoO_3$, has been produced by Example 8. The power source comprises the following components: two cathodes based on molybdenum oxide produced by the method of condensation-solidification. Average specific weight of cathode material is 3.66 g/cm$^3$. Thickness of $MoO_3$ layer on cathode is—85 μm. Electrode geometry size is 2×(1.2×1.2) cm. Aluminum foil with the 20 μm thickness is used as a current collector. Cathode is covered by the layer of inorganic electrolyte with 5 μm thickness. At room temperature solid inorganic electrolyte has specific conductivity in lithium cations $10^{-5}$ Cm/cm. Solid inorganic electrolyte was applied by the method of thermal vacuum condensation-solidification by Example 14. Separator with 25 μm thickness was impregnated with liquid non-aqueous electrolyte. Metal lithium was used as an anode. The cell was tested under the following conditions: discharge current—0.3 mA; charge current—0.15 mA. Before testing the element was stored for two months. Results of cell testing are as follows: discharge capacity—27 mA·h; specific capacity of cathode—305 mA·h/g. Specific volume energy per electrode structure is 870 mA·h/dm$^3$ (Table 2 p. 16).

EXAMPLE 33

Electrode produced in Example 7 is placed into the case of dick design power source comprising lithium negative electrode and liquid aprotic electrolyte. In this case surface of current collector, on which cathode material was applied, is developed. Power source is sealed and tested—its discharge capacity is measured. At cell discharging, cathode discharge capacity reaches 300 mA·h/g. It constitutes 690 mA·h/cm$^3$ of cathode. $MoO_3$ electrode layer thickness is 1.32 mm (Table 2 p. 1).

EXAMPLE 34

Electrode produced in Example 8 is placed into the case of dick-design power source comprising lithium negative electrode and liquid aprotic electrolyte. In this case current collector surface, on which cathode material is applied, is smooth. Thickness of such electrode is 1.3 1.3 mm. $MoO_3$ separated from the smooth surface of current collector even after insignificant shaking (Table 2 p. 2).

EXAMPLE 35

Two electrodes produced under the conditions of Sample 7, are placed into the case of prismatic design power source of laminated aluminum foil, comprising lithium negative electrode and liquid aprotic electrolyte. Layer thickness of one electrode is 0.9 mm, and another one is 1.0 mm. Average specific weight of $MoO_3$— cathode is 1.5 g/cm$^3$. Power source is sealed and tested (measurement of its discharge capacity). At cell discharging, cathode specific discharge capacity is 300 mA·h/g. In this case volume capacity of cathode is 450 mA·h/cm$^3$. (Table 2, p. 4).

The battery designs presented in FIGS. 3 and 4 are the evidence of usefulness and industrial applicability of the proposed invention. The disc design battery (FIG. 3), consists of 1—cell case. 2—cathode current collector. 3—cathode. 4—anode current collector. 5—anode (metal lithium). 6—separator. 7—cover. 8—poly propylene gasket. Prismatic design battery, presented in FIG. 4 consists of 1—Case of cell case. 2—Cathode current collector. 3—Cathode. 4—Anode current collector. 5—Anode (metal lithium). 6—Separator. 7—Welds.

The above examples are illustrated by the results presented in Tables 1, 2.

REFERENCES

1. I. A. Kedrinsky, V. E. Dmitrenko, Yu. M. Povarov, and I. I. Grudyanov. Chemical power sources with lithium electrode.—Krasnoyarsk: Krasnoyarsk university, 1983, P. 95.
2. V. M. Nagimy, R. D. Apostolova, A. S. Baskevich, and E. M. Shembel. Electrolytical production of molybdenum oxides//Zhurnal prikladnoy khimii 2000, No 3, P. 406-409.
3. U.S. Pat. No. 4,572,873/Feb. 25, 1986/.Kanehori et al.
4. I. S. Vereschagin, K. I. Tikhonov, and A. L. Rotinyan. Electrochemical behavior of molybdenym oxide films in propylene carbonate//Elektrokhimiya.—1981—V. 17.—No 5. P. 783-787.
5. Molybdenum. Collection. Foreign Literature Publishing, Ed. A. K. Natanson. Moscow, 1959, P. 304.
6. Brief reference book of chemist. Ed. 6, M, 1963.
7. V. A. Dubok, E. S. Kotenko. Chemistry and physics of semiconductors. Kiev, <<Vyscha Shkola">>, 1973, P. 287.
8. G. V. Samsonov, T. G. Bulankova, A. L. Burykina, et al. Physical and chemical properties of oxides. <<Metallurgy>>, 1969, P. 273.

SHORT DESCRIPTION OF THE DRAWINGS

FIG. 1. Change of the specific capacity of $FeS_2$-based cathode depending on a number of charge-discharge cycles. Curve with triangular points corresponds to a discharge. Curve with round points corresponds to a charge.

FIG. 2. Dependence of specific discharge capacity on cathode material thickness. Line with transparent points corresponds to the discharge current density up to 0.8 mA/cm$^2$. Line with black points corresponds to the discharge current density of 5 mA/cm$^2$.

FIG. 3. Circuit of the prototypes of the disc design micro battery based on $MoO_3$, produced by the method of thermal vacuum condensation-solidification.

FIG. 4. Circuit of the prototypes of prismatic design micro battery with the $MoO_3$,-based cathode produced by the method of thermal vacuum condensation-solidification.

FIG. 5. Investigation of the mechanical strength, adhesion and cohesion of electrodes based on molybdenum oxides.

FIG. 6. Dependence of $MoO_3$ structure amorphism on electrode thickness.

FIG. 7. Change of the specific weight of $MoO_3$ in the cathode thickness produced by the method of thermal vacuum condensation-solidification in the cathode thickness.

FIG. 8. Change of the specific electronic conductivity of $MoO_3$ layer depending on the electrode discharging degree.

TABLE 1

| No Example | Weight of evaporated substance, Γ | Evaporation temperature, °C. | Evaporation time sec. | Substrate temperature °C. | Rate of substrate cooling, °C./sec | Volume of working chamber | Other conditions | Material adhesion to substrate | XRD-analysis | Note |
|---|---|---|---|---|---|---|---|---|---|---|
| 1 | 10·10$^{-3}$ | 650 | 3 | 20 | 2 | x | — | Weak | amorphous-crystalline ($Mo_4O_{11}$) | Weak adhesion relative to substrate |
| 2 | 15·10$^{-3}$ | 620 | 3 | 200 | 10 | x/2 | — | Good | $MoO_2$, $MoO_3$, $Mo_4O_{11}$ | Low $MoO_3$ content in active mass |
| 3 | 15·10$^{-3}$ | 700 | 3 | 100 | 20 | x/2 | — | Good | Amorphous structure | Low electrochemical characteristics |
| 4 | 15·10$^{-3}$ | 700 | 3 | 130 | 20 | x/2 | — | Weak | $Mo_4O_{11}$ | Low electrochemical characteristics |
| 5 | 15·10$^{-3}$ | 700 | 3 | 160 | 20 | x/2 | — | Weak | $MoO_2$ | $MoO_3$ unavailability |
| 6 | 15·10$^{-3}$ | 700 | 3 | 230 | 20 | x/2 | — | Good | $MoO_3$ | Claimed conditions |
| 7 | 0.9 | 700 | 20 | 300 | 3 | x/2 | — | Good | $MoO_3$ | Low specific weight of $MoO_3$ |
| 8 | 0.91 | 700 | 20 | 250 | 3 | x/2 | — | Good | $MoO_3$ | Claimed conditions |
| 9 | 15·10$^{-3}$ | 750 | 50 | 40 | — | x/2 | Temperature of working | Good | $Fe_9S_8$ + S monoclinic | $FeS_2$-pyrite unavailability |

TABLE 1-continued

| No Example | Weight of evaporated substance, Г | Evaporation temperature, °C. | Evaporation time sec. | Substrate temperature °C. | Rate of substrate cooling, °C./sec | Volume of working chamber | Other conditions | Material adhesion to substrate | XRD-analysis | Note |
|---|---|---|---|---|---|---|---|---|---|---|
| 10 | $15 \cdot 10^{-3}$ | 800 | 51 | 40 | — | x/2 | space - 500° C. Temperature of working space 240° C., sulfur vapors availability | Good | $Fe_3S_4 + Fe_7S_8$ | $FeS_2$-pyrite unavailability |
| 11 | $15 \cdot 10^{-3}$ | 800 | 110 | 40 | — | x/2 | Temperature of working space 150° C., sulfur vapor availability | Good | Monoclinic + orthorhombic, $FeS_2$, $Fe_3S_4$, FeS | Low-content $FeS_2$-pyrite |
| 12 | $15 \cdot 10^{-3}$ | 800 | 50 | 40 | — | x/2 | Temperature of working space 190° C., sulfur vapor availability | Good | $FeS_2$-pyrite (95%) + $FeS_2$-marcasite | Claimed conditions |
| 13 | $5 \cdot 10^{-3}$ | 900/1500 | 31 | 200 | 3.3 | x/2 | Stage heating at substance evaporation | Good | Inclusions of the crystalline phases of $Li_2WO_4$, $Li_4B_{10}O_{17}$, coarse-grained film of different thickness | Low quality of solid electrolyte film |
| 14 | $5 \cdot 10^{-3}$ | 800/1000 | 50 | 40 | — | x/2 | Staggered heating at substance evaporation | Good | X-ray amorphous, optically transparent film | Claimed conditions |
| 15 | $5 \cdot 10^{-3}$ | 1000/1200/1500 | 43 | 20/300 | 3.3 | x/2 | Staggered heating at substance evaporation | Good | Coarse-grained crystalline film of different thickness | Low quality of solid electrolyte film |
| 16 | $5 \cdot 10^{-3}$ | 1000/1200/1500 | 38 | 20/300 | — | x/2 | Staggered heating at substance evaporation | Good | X-ray amorphous, optically transparent film | Claimed conditions |

TABLE 2

| No | No Example | Evaporated material | Cathode thickness, μm | Specific weight of cathode layer, g/cm³ | Design of cell case | Surface of current collector | Electrolyte | Discharge cathode capacity, mA · h/g/ mA · h/c3³ | | | | Note |
|---|---|---|---|---|---|---|---|---|---|---|---|---|
| | | | | | | | | 1st cycle | 10-th cycle | 30-th cycle | 100-й ЦИКЛ | |
| 1 | 33 | $MoO_3$ | 1320 | 2.3 | Disc | Developed | Liquid | 300/690 | — | — | — | Low discharge capacity. Cathode specific weight is lower than the below claimed conditions |
| 2 | 34 | $MoO_3$ | 1300 | 2.8 | Disc | Smooth | Liquid | — | — | — | — | Cathode spalling from current collector. Non-execution of claimed conditions |
| 3 | 17 | $MoO_3$ | 1300 | 2.73 | Disc | Developed | Liquid | 300/819 | — | — | — | Claimed properties of the cell. |
| 4 | 35 | $MoO_3$ | 1900 | 1.5 | Prismatic | Developed | Liquid | 300/450 | — | — | — | Low discharge capacity. Cathode specific weight is |

TABLE 2-continued

| No | No Example | Evaporated material | Cathode thickness, μm | Specific weight of cathode layer, g/cm³ | Design of cell case | Surface of current collector | Electrolyte | Discharge cathode capacity, mA·h/g/ mA·h/c³ | | | | Note |
|---|---|---|---|---|---|---|---|---|---|---|---|---|
| | | | | | | | | 1st cycle | 10-th cycle | 30-th cycle | 100-й ЦИКЛ | |
| 5 | 18 | $MoO_3$ | 1400/1400 | 2.1-3.9 | Prismatic | Developed | Liquid | 300/800 | — | — | — | lower than the claimed conditions Claimed properties of a cell |
| 6 | 19 | $MoO_3$ | 2.5 | 3.2 | Disc | Smooth | Liquid | 260 | 182 | 151 | 121 | Claimed properties of a cell |
| 7 | 19 | $MoO_3$ | 25 | 3.28 | Disc | Smooth | Liquid | 300 | 113 | 90 | — | Claimed properties of a cell. |
| 8 | 20 | $MoO_3$ | 2 | 3.2 | Disc | Smooth | Polymer | 284 | 166 | 126 | 100 | Claimed properties of a cell. |
| 9 | 20 | $MoO_3$ | 11 | 3.2 | Disc | Smooth | Polymer | 313 | 134 | 100 | — | Claimed properties of a cell. |
| 10 | 21 | $MoO_3$ | 2 | 3.2 | Disc | Smooth | Solid/liquid | 390 | 240 | 200 | 140 | Claimed properties of a cell |
| 11 | 22 | $FeS_2$ | 2 | 4.5 | Disc | Smooth | Liquid | 850 | — | — | — | Low reversible electrochemical characteristics |
| 12 | 23 | $FeS_2$ | 2 | 4.5 | Disc | Smooth | Polymer | 850 | — | — | — | Low reversible electrochemical characteristics |
| 13 | 24 | $FeS_2$ | 2 | 4.5 | Disc | Smooth | Solid/Liquid | 850 | 328 | 322 | 175 | Claimed properties of a cell |
| 14 | 30 | $MoO_3$ | 30-170 | 3.0-3.6 | Prismatic | Smooth | Solid/Liquid | 360 | — | — | — | Claimed properties of a cell. |
| 15 | 31 | $MoO_3$ | 1250 | 2.66 | Prismatic | Developed | Liquid | 317/843 | — | — | — | Claimed properties of a cell |
| 16 | 32 | $MoO_3$ | 85 | 3.66 | Prismatic | Smooth | Solid/Liquid | 305/1116 | — | — | — | Claimed properties of a cell. |

The invention claimed is:

1. A production method of a lithium battery comprising:
applying an active cathode mass on a current collector, anode, separator and non-aqueous electrolyte, the cathode mass comprising electrochemical active material in the form of metal oxides or sulfides as a compact deposit and having a density of 2.6-4.9 g/cm³;
selecting a cathode active layer thickness within the range of 0.5 μm-3 mm;
adjusting temperature and duration of the temperature while applying a solid electrolyte;
performing controlled cooling of the solid electrolyte, wherein during a transition of the solid electrolyte from a gas phase to liquid phase, the solid electrolyte penetrates into pores formed on the active cathode mass and the solid electrolyte is uniformly distributed in an electrode volume; and
providing a thickness of the solid electrolyte layer of 2-10 μm.

2. The production method of claim 1, characterized in that lithium, lithium alloys, carbon or any other compounds reversible in lithium cations are used as an anode material.

3. The production method of claim 1, characterized in that bending the cathode provides no contact fault between the active mass and the current collector in the bending radius range of 0.4 mm-3.9 mm at the layer thickness of active cathode material ranging from 0.5 μm up to 440 μm.

4. The production method of claim 1, further comprising producing the active cathode material as a compact deposit, consisting of molybdenum trioxide ($MoO_3$).

5. The production method of claim 1, further comprising producing the active cathode material as a compact deposit consisting of iron sulfides.

6. The production method of claim 1, further compromising changing the density of cathode active material layer and its structure in the direction from the current collector/active cathode material interface to the cathode active material/non-aqueous electrolyte interface so that at the current collector/active cathode material interface, active material density is higher than that at the active material/liquid electrolyte interface, in this case the density can change by the value of 2 g/cm³ in the thickness of electrochemically active metal oxide layer up to 1.4 mm.

7. The production method of claim 1, further comprising applying the cathode active material on the surface of current collector by the method of thermal vacuum condensation-solidification.

8. The production method of claim 1, further comprising using a molybdenum evaporator in the process of cathode production.

9. The production method of claim 1, further comprising using stainless steel, aluminum or titanium as a cathode current collector.

10. The production method of claim 4, characterized in that in the process of $MoO_3$ application, a temperature of cathode current collector ranges from 210 up to 250° C. at the rate of layer cooling from 18 up to 22° C./sec.

11. The production method of claim 1, characterized in that the cathode mass comprises 100% of said electrochemical active material.

12. The production method of claim 5, characterized in that in the process of $FeS_2$ application in the presence of sulfur vapors temperature of current collector is 20-60° C.

13. The production method of claim 1, further comprising using metal with a developed surface as a cathode current collector.

14. The production method of claim 1, characterized in that in the process of $MoO_3$ application temperature of cathode current collector ranges 230-270 $MoO_3$ at the rate of layer cooling 2-4° C./sec.

15. The production method of claim 1, characterized in that a liquid electrolyte is used as non-aqueous electrolyte.

16. The production method of claim 1, characterized in that solid inorganic electrolyte with lithium cation conductivity is used as a non-aqueous electrolyte.

17. The production method of claim 1, characterized in that cathode surface is covered with solid electrolyte layer.

18. The production method of claim 1, characterized in that at the stage of solid electrolyte material transition from a gas phase into a liquid one, electrolyte penetrates into the pores of cathode material and uniformly distributes in electrode volume.

19. The production method of claim 1, characterized in that between the layer of solid electrolyte, coating cathode surface, and anode there is a separator impregnated with a liquid non-aqueous electrolyte.

20. The production method of claim 1, characterized in that between the layer of solid electrolyte, covering cathode surface, and anode there is a polymer electrolyte with lithium cation conductivity.

21. The production method of claim 1, characterized in that between the layer of polymer electrolyte, coating cathode surface, and lithium anode there is a separator impregnated with liquid non-aqueous electrolyte.

22. A lithium battery, comprising:

an active cathode mass applied on a current collector, anode, separator and non-aqueous electrolyte;

the cathode mass comprising electrochemical active material in the form of metal oxides or metal sulfides as a compact deposit and having a density of 2.6-4.9 $g/cm^3$.

23. The lithium battery of claim 22, wherein a thickness of the cathode active is in a range from 0.5 μm-3 mm.

24. The lithium battery of claim 22, wherein a density of the cathode active material and its structure are changed in the direction from the current collector/active cathode material interface to the cathode active material/non-aqueous electrolyte interface so that at the current collector/active cathode material interface, active material density is higher than that at the active material/liquid electrolyte interface.

* * * * *